S. R. Knox.
Fluting Mach.
No. 3938. Reissued Apr. 26. 1870
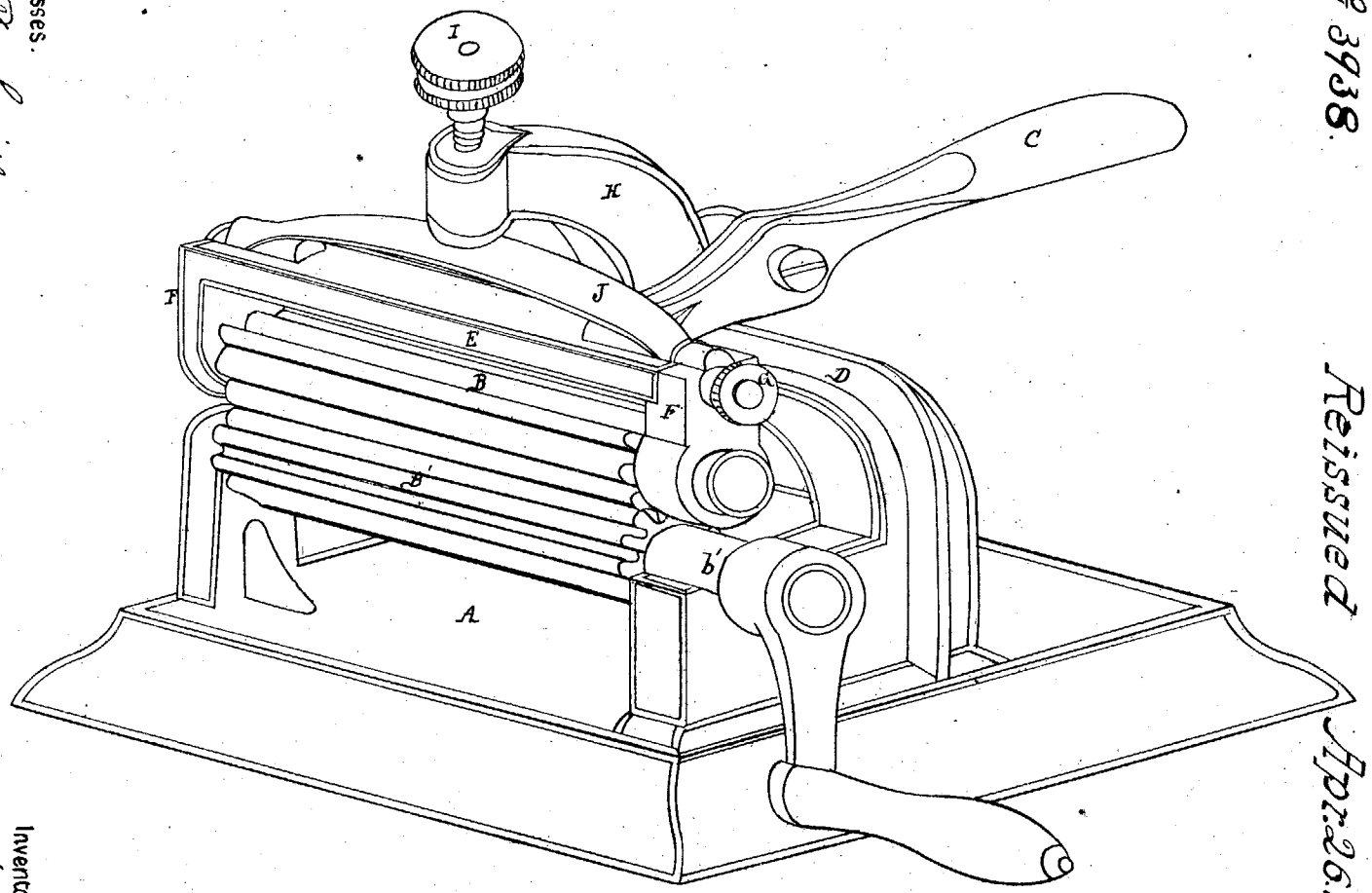
Witnesses.
C. D. Smith
Galon Lestemon
Inventor.
Susan R. Knox
Per O. Knight

UNITED STATES PATENT OFFICE.

SUSAN R. KNOX, OF NEW YORK, N. Y.

IMPROVEMENT IN FLUTING-MACHINES.

Specification forming part of Letters Patent No. 59,913, dated November 20, 1866; Reissue No. 3,938, dated April 26, 1870.

*To all whom it may concern:*

Be it known that I, SUSAN R. KNOX, of the city, county, and State of New York, have invented certain new and useful Improvements in Machines for Making Fluted Ruffles; and I do hereby declare the following to be a full and exact description of the nature, construction, and operation of the same, reference being had to the accompanying drawing, which is made a part of this specification, and which represents a perspective view of a fluting-machine embodying my invention.

This invention relates to a machine having a pair of corrugated rollers, between which the fabric or material to be fluted is drawn by the rotation of said rollers, the fluting effect, as well as the simultaneous rotation of the rollers in opposite directions, being caused by the intermeshing of the corrugations of one roller with the corresponding grooves of the other. These rollers are made hollow in order to heat them by the introduction of heating-irons or otherwise, and thus render the fabric more susceptible to the fluting action of the rollers.

A lever is applied to the upper roller to enable it to be temporarily elevated to admit of the introduction or withdrawal of the material under treatment.

The adjustable roller and lever, mounted in a suitable frame, are common in machines of this character, and are not directly involved in the present invention.

My invention consists, first, in a novel manner of arranging the standard which supports the upper roll-frame, so as to avoid obstruction to the free passage of the material to and from the rollers; second, in a novel method of applying a spring to cause the upper roller to exert a yielding pressure upon the material as it passes between the corrugated surfaces.

In order that others skilled in the art to which my invention appertains may be enabled to fully understand and use the same, I will proceed to describe it in detail.

In the accompanying drawing, A represents the base of the frame, on which are mounted the rollers B B′ and lever C. D is the standard, upon which the lever C is supported and fulcrumed.

Hitherto this standard has been located on the base A at some point (generally equidistant, or thereabout) between the ends of the rollers B B′, and hence, to a greater or less extent, it constituted a barrier to the passage of the material to or from the machine.

Now, by referring to the drawing, it will be seen that the standard D rises from the frame A at a point beyond the ends of the rollers B B′, extends upward until it clears the joint between the rollers, and thence extends horizontally, terminating at about the mid-length of the upper roller.

By forming and arranging the standard in this manner the way is left clear at either side of the rollers for the introduction or withdrawal of the material.

The lever C is pivoted at *c* to a lug formed at the inner terminus of the horizontal arm of the standard D, and the lever carries at its end the horizontal bar E; but the bearing F is attached by means of the thumb-screw G, which adapts the said bearing F to be detached and slipped off its journal, so as to leave that end of the roller B free, and thus permit the roller itself to be readily removed from the machine when it is to be replaced by a roller of different size, or such as may be formed to make the fluting or ruffling of a different character.

In order that the lower roller may be readily removed the upper half of its journal *b′* is left exposed, this journal being properly held within its semicircular bearing by the contact of the upper roller with the lower.

H represents a curved arm projecting from the extremity of the standard D, and terminating at a point directly above the center of the bar E. In the end of this arm works a screw, I, which is employed to regulate the force of a spring, J, the ends of which bear against the bar E at its opposite ends. This spring causes the upper roller to exert a yielding pressure upon the material while it is passing between the corrugated surfaces of the rollers, and thus material of different thickness or susceptibility of fluting may be acted upon with equally good results by the same pair of rollers.

Having thus described my invention, the following is what I claim as new therein and desire to secure by Letters Patent:

1. In combination with a movable frame carrying one of the fluting-rolls and its journal-boxes, a main frame or standard by which the movable frame is sustained, and which is so arranged as to permit the unobstructed passage of the work, substantially as set forth.

2. In combination with the movable roll-frame E and stationary standard D H, a single pressure-spring, J, and set-screw I, substantially as and for the purposes set forth.

SUSAN R. KNOX. [L. S.]

Witnesses:
S. M. HOWARD,
J. B. HOFFMAN.